US012602913B2

(12) United States Patent　　　(10) Patent No.:　US 12,602,913 B2

Lee　　　　　　　　　　　　　　　　(45) Date of Patent:　　Apr. 14, 2026

(54) APPARATUS FOR IDENTYFING OBJECT PRIORITY FOR AUTONOMOUS DRIVING CONTROL OF VEHICLE

(71) Applicants: Hyundai Motor Company, Seoul (KR); Kia Corporation, Seoul (KR)

(72) Inventor:　En Sun Lee, Seoul (KR)

(73) Assignees: Hyundai Motor Company, Seoul (KR); Kia Corporation, Seoul (KR)

( * ) Notice:　Subject to any disclaimer, the term of this patent is extended or adjusted under 35 U.S.C. 154(b) by 60 days.

(21) Appl. No.: 18/616,412

(22) Filed:　Mar. 26, 2024

(65)　　　　　Prior Publication Data

US 2025/0078482 A1　　Mar. 6, 2025

(30)　　　Foreign Application Priority Data

Sep. 4, 2023　(KR) ........................ 10-2023-0117176

(51) Int. Cl.
　　*G06V 10/776*　　　(2022.01)
　　*G06V 10/26*　　　(2022.01)
　　*G06V 10/28*　　　(2022.01)
　　*G06V 10/764*　　　(2022.01)
　　*G06V 20/56*　　　(2022.01)
　　*G06V 20/58*　　　(2022.01)

(52) U.S. Cl.
　　CPC ............ *G06V 10/776* (2022.01); *G06V 10/26* (2022.01); *G06V 10/28* (2022.01); *G06V 10/764* (2022.01); *G06V 20/58* (2022.01); *G06V 20/588* (2022.01)

(58) Field of Classification Search
　　CPC ...... G06V 10/776; G06V 10/26; G06V 10/28; G06V 10/764; G06V 20/58; G06V 20/588; G06V 20/56; G01S 17/931; G01S 17/894; B60W 30/08; B60W 40/02; B60W 2420/408
　　See application file for complete search history.

(56)　　　　　　References Cited

U.S. PATENT DOCUMENTS

| | | | | |
|---|---|---|---|---|
| 9,836,056 | B2 * | 12/2017 | Ansari ................... | G06V 20/58 |
| 9,852,632 | B2 * | 12/2017 | Sempuku ............... | G06V 20/58 |
| 11,472,432 | B2 * | 10/2022 | Awano .................... | B60R 99/00 |
| 12,046,013 | B2 * | 7/2024 | Carr ....................... | B60W 30/12 |
| 2023/0116386 | A1 * | 4/2023 | Huang ..................... | B62D 6/02 |
| | | | | 701/41 |
| 2024/0230866 | A1 * | 7/2024 | Ma ........................... | G06T 7/10 |

* cited by examiner

*Primary Examiner* — Jonathan Malikasim
(74) *Attorney, Agent, or Firm* — Banner & Witcoff, Ltd.

(57)　　　　　　ABSTRACT

An object display apparatus and a method thereof are provided. The object display apparatus includes a sensor, such as a light detection and ranging (LiDAR) device, and a processor. The processor determines an object located in front of a vehicle based on contour points in a first frame obtained via the sensor at a first time, determines at least one of lane information, longitudinal position information, lateral position information, classification information, number information, or size information, determines whether the object is included in a first group among a plurality of groups, sorts the object at least one other object included in the first group, determines a priority of the object among all objects identified in the first frame, based on a priority of the first group and a result of the sorting, and selects the object as a display target in a second frame.

20 Claims, 9 Drawing Sheets

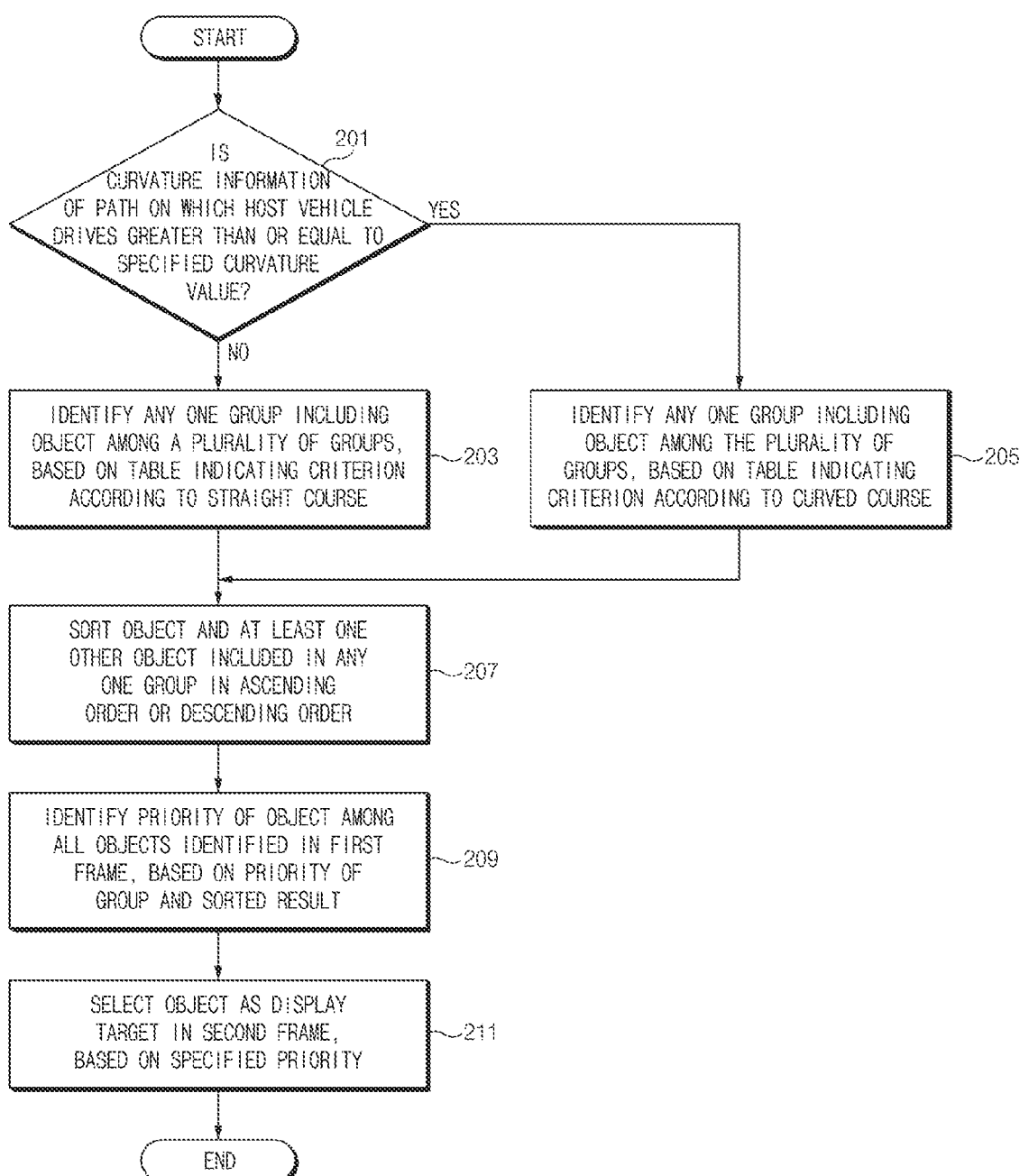

START

201

IS CURVATURE INFORMATION OF PATH ON WHICH HOST VEHICLE DRIVES GREATER THAN OR EQUAL TO SPECIFIED CURVATURE VALUE?

YES

NO

IDENTIFY ANY ONE GROUP INCLUDING OBJECT AMONG A PLURALITY OF GROUPS, BASED ON TABLE INDICATING CRITERION ACCORDING TO STRAIGHT COURSE
203

IDENTIFY ANY ONE GROUP INCLUDING OBJECT AMONG THE PLURALITY OF GROUPS, BASED ON TABLE INDICATING CRITERION ACCORDING TO CURVED COURSE
205

SORT OBJECT AND AT LEAST ONE OTHER OBJECT INCLUDED IN ANY ONE GROUP IN ASCENDING ORDER OR DESCENDING ORDER
207

IDENTIFY PRIORITY OF OBJECT AMONG ALL OBJECTS IDENTIFIED IN FIRST FRAME, BASED ON PRIORITY OF GROUP AND SORTED RESULT
209

SELECT OBJECT AS DISPLAY TARGET IN SECOND FRAME, BASED ON SPECIFIED PRIORITY
211

END

FIG.2

| GROUP | PRIORITY OF GROUP | CONTENTS |
|---|---|---|
| 13 | 1 | OBJECT CLASSIFIED AS PEDESTRIAN, RANK 1 LANE, OBJECT IN WHICH ONE SIDE OF OBJECT BOX IS GREATER THAN OR EQUAL TO 1.5 M |
| 12 | 2 | OBJECT IN WHICH ONE SIDE OF OBJECT BOX IS GREATER THAN OR EQUAL TO 20 M, OBJECT CLASSIFIED AS ROAD BOUNDARY, RANK 2 LANE, OBJECT IN WHICH ONE SIDE OF OBJECT BOX IS GREATER THAN OR EQUAL TO 1.5 M |
| 11 | 3 | RANK 1 AND 2 LANES, OBJECT CLASSIFIED AS POLE |
| 10 | 4 | RANK 3 LANE, OBJECT IN WHICH ONE SIDE OF OBJECT BOX IS GREATER THAN OR EQUAL TO 1.5 M |
| 9 | 5 | RANK 1 AND 2 LANES, OBJECT IN WHICH ONE SIDE OF OBJECT BOX IS LESS THAN 1.5 M |
| 8 | 6 | RANK 4 LANE, OBJECT IN WHICH ONE SIDE OF OBJECT BOX IS GREATER THAN OR EQUAL TO 2 M |
| 7 | 7 | RANK 5 LATERAL POSITION, OBJECT IN WHICH ONE SIDE OF OBJECT BOX IS GREATER THAN OR EQUAL TO 4 M |
| 6 | 8 | RANK 3 LANE, OBJECT IN WHICH ONE SIDE OF OBJECT BOX IS LESS THAN 1.5 M |
| 5 | 9 | RANK 4 LANE, OBJECT IN WHICH ONE SIDE OF OBJECT BOX IS LESS THAN 2 M |
| 4 | 10 | RANK 5 LATERAL POSITION, OBJECT LOCATED WITHIN 17 M IN LATERAL DIRECTION |
| 3 | 11 | RANK 5 LATERAL POSITION, OBJECT LOCATED OUT OF 17 M IN LATERAL DIRECTION OR OUT OF 80 M IN LONGITUDINAL DIRECTION |
| 2 | 12 | RANK 5 LATERAL POSITION, OBJECT LOCATED OUT OF 30 M IN LATERAL DIRECTION |
| 1 | 13 | RANK 1-4 LANES, OR RANK 5 LATERAL POSITION, OBJECT IN WHICH CONTOUR POINTS ARE LESS THAN 5 |

321

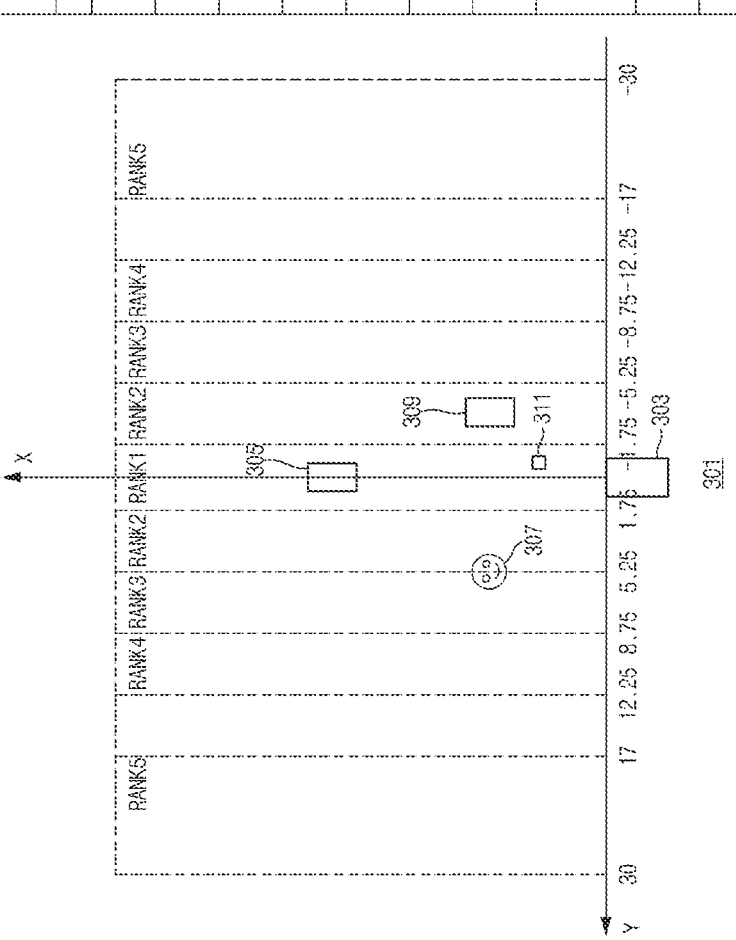

FIG.3

Figure 4:
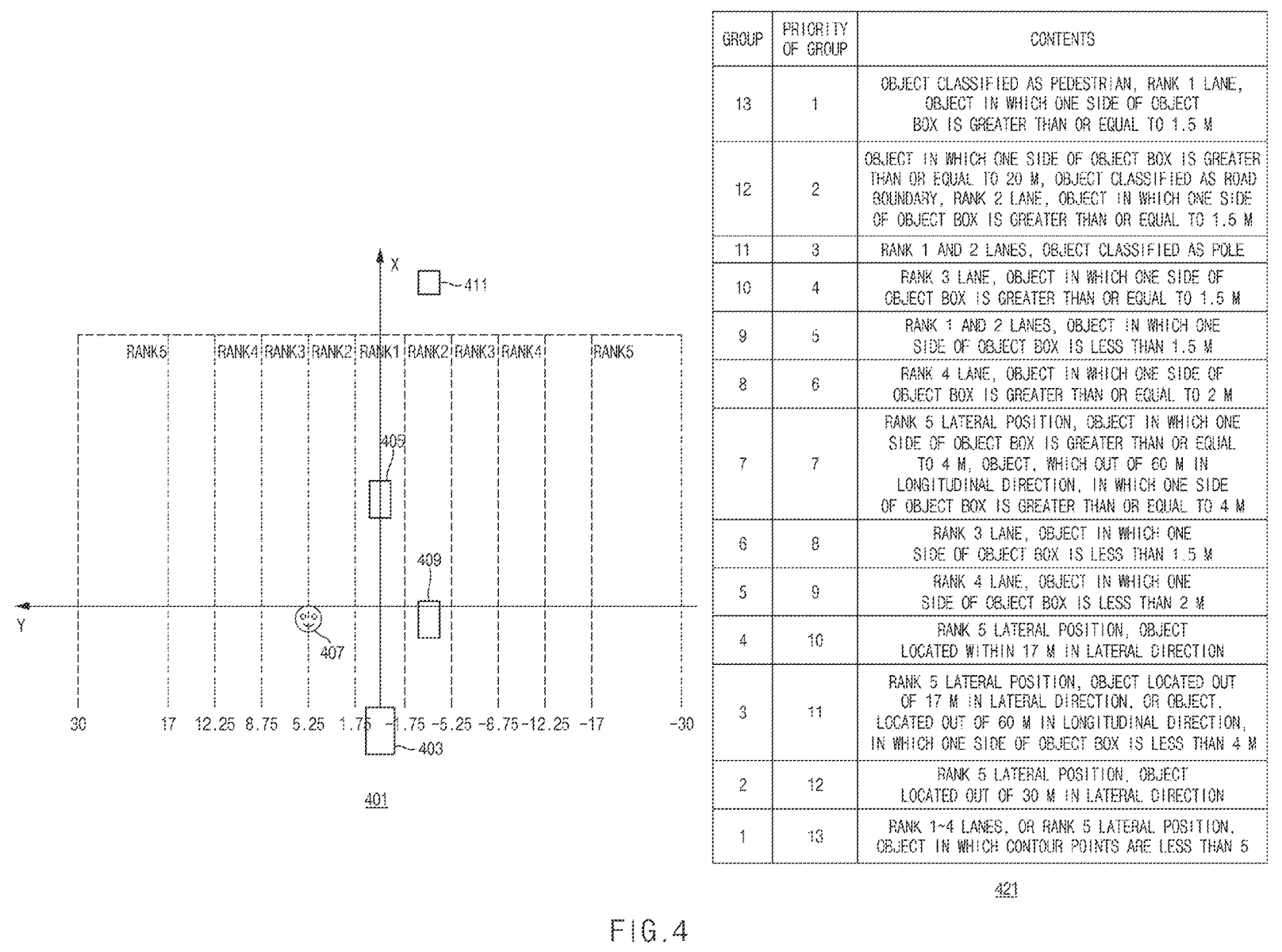

| GROUP | PRIORITY OF GROUP | CONTENTS |
|---|---|---|
| 13 | 1 | OBJECT CLASSIFIED AS PEDESTRIAN, RANK 1 LANE, OBJECT IN WHICH ONE SIDE OF OBJECT BOX IS GREATER THAN OR EQUAL TO 1.5 M |
| 12 | 2 | OBJECT IN WHICH ONE SIDE OF OBJECT BOX IS GREATER THAN OR EQUAL TO 20 M, OBJECT CLASSIFIED AS ROAD BOUNDARY, RANK 2 LANE, OBJECT IN WHICH ONE SIDE OF OBJECT BOX IS GREATER THAN OR EQUAL TO 1.5 M |
| 11 | 3 | RANK 1 AND 2 LANES, OBJECT CLASSIFIED AS POLE |
| 10 | 4 | RANK 3 LANE, OBJECT IN WHICH ONE SIDE OF OBJECT BOX IS GREATER THAN OR EQUAL TO 1.5 M |
| 9 | 5 | RANK 1 AND 2 LANES, OBJECT IN WHICH ONE SIDE OF OBJECT BOX IS LESS THAN 1.5 M |
| 8 | 6 | RANK 4 LANE, OBJECT IN WHICH ONE SIDE OF OBJECT BOX IS GREATER THAN OR EQUAL TO 2 M |
| 7 | 7 | RANK 5 LATERAL POSITION, OBJECT IN WHICH ONE SIDE OF OBJECT BOX IS GREATER THAN OR EQUAL TO 4 M, OBJECT, WHICH OUT OF 60 M IN LONGITUDINAL DIRECTION, IN WHICH ONE SIDE OF OBJECT BOX IS GREATER THAN OR EQUAL TO 4 M |
| 6 | 8 | RANK 3 LANE, OBJECT IN WHICH ONE SIDE OF OBJECT BOX IS LESS THAN 1.5 M |
| 5 | 9 | RANK 4 LANE, OBJECT IN WHICH ONE SIDE OF OBJECT BOX IS LESS THAN 2 M |
| 4 | 10 | RANK 5 LATERAL POSITION, OBJECT LOCATED WITHIN 17 M IN LATERAL DIRECTION |
| 3 | 11 | RANK 5 LATERAL POSITION, OBJECT LOCATED OUT OF 17 M IN LATERAL DIRECTION, OBJECT LOCATED OUT OF 60 M IN LONGITUDINAL DIRECTION, IN WHICH ONE SIDE OF OBJECT BOX IS LESS THAN 4 M |
| 2 | 12 | RANK 5 LATERAL POSITION, OBJECT LOCATED OUT OF 30 M IN LATERAL DIRECTION |
| 1 | 13 | RANK 1~4 LANES, OR RANK 5 LATERAL POSITION, OBJECT IN WHICH CONTOUR POINTS ARE LESS THAN 5 |

| | PRIORITY OF GROUP | 1 | | 2 | 3 | | | 4 | | 5 | | 6 | 7 | | 8 | | |
|---|---|---|---|---|---|---|---|---|---|---|---|---|---|---|---|---|---|
| 505 | OBJECT ID | 11 | 1 | 12 | 13 | 14 | 2 | 3 | 15 | 5 | 4 | 6 | 7 | 8 | 10 | 9 | ... |
| 507 | LONGITUDINAL POSITION | 10m | 50m | 12m | 12m | 30m | 60m | 12m | 15m | 40m | 50m | 10m | 30m | 70m | 10m | 80m | |
| 509 | PRIORITY OF OBJECT | 1 | 2 | 3 | 4 | 5 | 6 | 7 | 8 | 9 | 10 | 11 | 12 | 13 | 14 | 15 | ... |

(503 — PRIORITY OF GROUP)

APPARATUS FOR IDENTYFING OBJECT PRIORITY FOR AUTONOMOUS DRIVING CONTROL OF VEHICLE

CROSS-REFERENCE TO RELATED APPLICATION

This application claims the benefit of priority to Korean Patent Application No. 10-2023-0117176, filed in the Korean Intellectual Property Office on Sep. 4, 2023, the entire contents of which are incorporated herein by reference.

TECHNICAL FIELD

The present disclosure relates to an object display apparatus and a method thereof, and more particularly, relates to selecting a display target using a light detection and ranging (LiDAR) device.

BACKGROUND

An autonomous vehicle or a vehicle in which a driving aid is activated may identify a surrounding environment and obstacles using a sensor to ensure stable driving and determine a path. Particularly, because the precision of data obtained using a LiDAR is greater than the precision of data obtained using a radio detection and ranging (RADAR) device, much research has been conducted to improve methods of identifying a surrounding object using the LiDAR.

The vehicle may obtain data indicating a position of an object around the vehicle by means of the LiDAR. The LiDAR may measure the distance between the LiDAR and the object based on a time interval between transmitting laser and receiving the laser reflected from the object. The vehicle may identify a position of a point on the surface of the object, within the three-dimensional space which the vehicle occupies, based on an angle of the transmitted laser and the distance to the object.

The autonomous vehicle or the vehicle in which the driving aid is activated may identify information on an object indicated by obtained points, based on movement information of the points. Particularly, identification of whether the object is an object in a moving state (e.g., a moving object), an object which is able to be in the moving state (e.g., a movable stationary object), or an object which is unable to in the moving state (e.g., an unmovable stationary object) may be helpful in ensuring the stability and quality of the autonomous drive or the driving aid and reduce the risk of an accident.

SUMMARY

The present disclosure has been made to solve the above-mentioned problems occurring in at least some implementations while advantages achieved by those implementations are maintained intact.

An aspect of the present disclosure provides an object display apparatus for selecting a display target after obtaining a code indicating a specified error and a method thereof.

An aspect of the present disclosure provides an object display apparatus for identifying whether an object is included in any of a plurality of groups divided according to an importance of the object to identify whether the object is selected as a display target and a method thereof.

An aspect of the present disclosure provides an object display apparatus for changing a criterion for selecting an object as a display target, depending on a curvature of path on which a host vehicle operates, and a method thereof.

The technical problems to be solved by the present disclosure are not limited to the aforementioned problems, and any other technical problems not mentioned herein will be clearly understood from the following description by those skilled in the art to which the present disclosure pertains.

According to one or more example embodiments of the present disclosure, an object display apparatus may include: a sensor; and a processor. The processor may be configured to determine an object located in front of a vehicle based on contour points in a first frame obtained via the sensor at a first time and further based on a code, obtained at a second time later than the first time, indicating an error; determine information indicating at least one of: a lane in which the object is located, a longitudinal component of a distance between the object and the vehicle, a lateral component of the distance, a classification of the object, a quantity of a portion of the contour points that is included in an object box indicating the object, or a size of the object box; determine whether the object is included in a first group among a plurality of groups divided according to an importance of the object, based on the information; sort the object and at least one other object included in the first group, based on the longitudinal component; determine a priority of the object among all objects identified in the first frame, based on a priority of the first group and a result of the sorting of the object; and select the object as a display target in a second frame, obtained at a third time later than the second time, based on a determination that the priority of the object is greater than a specified priority.

The processor may be configured to determine whether the object is included in the first group by: determining coordinates of a point corresponding to the vehicle; obtaining an indication of a curvature of a path on which the vehicle operates; determining whether the longitudinal component is less than a threshold value; and determining whether the object is included in the first group, further based on the longitudinal component being less than the threshold value. The threshold value may be one of: a first value, based on the curvature being greater than or equal to a specified curvature value, or a second value greater than the first value, based on the curvature being less than the specified curvature value.

The processor may be further configured to: determine coordinates of a point corresponding to the vehicle; sort a second object, having a first longitudinal position value, among the second object and the at least one other object included in the first group by assigning, to the second object, a first priority; and sort a third object, having a second longitudinal position value less than the first longitudinal position value by assigning, to the third object, a second priority greater than the first priority.

The code may indicate that a point cloud for generating the contour points has not been obtained within a specified time window.

The lane may be a first lane. The processor may be further configured to: assign a first priority to a second group that includes a second object associated with a second lane; and assign a second priority, which is greater than the first priority, to a third group that includes a third object associated with a third lane. A distance between the first lane and the second lane may be greater than a distance between the first lane and the third lane.

The processor may be further configured to: select all objects included in the first group as display targets in the second frame, based on a determination that the priority of the first group is greater than a priority of a specified group.

The processor may be further configured to: determine a speed of the vehicle. The specified priority and the speed of the vehicle may have an inverse correlation.

The processor may be configured to select the object as the display target by: selecting the object as the display target in the second frame further based on: the classification of the object being one of a pedestrian or a preceding vehicle, and the vehicle being located in the lane or in a second lane adjacent to the lane.

The processor may be configured to select the object as the display target by: obtaining, from a map system, a signal indicating that the vehicle is located in an area that is not a highway; determining that the classification of the object is a pedestrian; and selecting the object as the display target in the second frame further based on the signal and a determination that the classification of the object is the pedestrian.

The processor may be configured to determine whether the object is included in the first group by: determining whether the object is included in the first group further based on a length of a longer of a longitudinal segment of the object box and a lateral segment of the object box being greater than a threshold length.

According to one or more example embodiments, an object display method may include: determining an object located in front of a vehicle based on contour points in a first frame obtained via a sensor at a first time and further based on a code, obtained at a second time alter than the first time, indicating an error; determining information indicating at least one of: a lane in which the object is located, a longitudinal component of a distance between the object and the vehicle, a lateral component of the distance, a classification of the object, a quantity of a portion of the contour points that is included in an object box indicating the object, or a size of the object box; determining whether the object is included in a first group among a plurality of groups divided according to an importance of the object, based on the information; sorting the object and at least one other object included in the first group, based on the longitudinal component; determining a priority of the object among all objects identified in the first frame, based on a priority of the first group and a result of the sorting of the object; and selecting the object as a display target in a second frame, obtained at a third time later than the second time, based on a determination that the priority of the object is greater than a specified priority.

Determining whether the object is included in the first group may include: determining coordinates of a point corresponding to the vehicle; obtaining an indication of a curvature of a path on which the vehicle operates; determining whether the longitudinal component is less than a threshold value; and determining whether the object is included in the first group, further based on the longitudinal component being less than the threshold value. The threshold value may be one of: a first value, based on the curvature being greater than or equal to a specified curvature value, or a second value greater than the first value, based on the curvature being less than the specified curvature value.

The object display method may further include: determining coordinates of a point corresponding to the vehicle; sorting a second object, having a first longitudinal position value, among the second object and the at least one other object included in the first group by assigning, to the second object, a first priority; and sorting a third object, having a second longitudinal position value less than the first longitudinal position value by assigning, to the third object, a second priority greater than the first priority.

The code may indicate that a point cloud for generating the contour points has not been obtained within a specified time window.

The lane may be a first lane. The method may further include: assigning a first priority to a second group that includes a second object associated with a second lane; and assign a second priority, which is greater than the first priority, to a third group that includes a third object associated with a third lane. A distance between the first lane and the second lane may be greater than a distance between the first lane and the third lane.

The object display method may further include: selecting all objects included in the first group as display targets in the second frame, based on a determination that the priority of the first group is greater than a priority of a specified group.

The object display method may further include: determining a speed of the vehicle. The specified priority and the speed of the vehicle may have an inverse correlation.

Selecting the object as the display target may include: selecting the object as the display target in the second frame further based on: the classification of the object being one of a pedestrian or a preceding vehicle, and the vehicle being located in the lane or in a second lane adjacent to the lane.

Selecting the object as the display target may include: obtaining, from a map system, a signal indicating that the vehicle is located in an area that is not a highway; determining that the classification of the object is a pedestrian; and selecting the object as the display target in the second frame further based on the signal and a determination that the classification of the object is the pedestrian.

Determining whether the object is included in the first group may include: determining whether the object is included in the first group further based on a length of a longer of a longitudinal segment of the object box and a lateral segment of the object box being greater than a threshold length.

In addition, various effects ascertained directly or indirectly through the present disclosure may be provided.

BRIEF DESCRIPTION OF THE DRAWINGS

The above and other objects, features and advantages of the present disclosure will be more apparent from the following detailed description taken in conjunction with the accompanying drawings:

FIG. 2 illustrates flow of an operation of an object display apparatus for selecting a referenced table depending on curvature information, in an object display apparatus or an object display method;

FIG. 3 illustrates a criterion for selecting an object as a display target, when curvature information is less than a specified curvature value, in an object display apparatus or an object display method;

FIG. 4 illustrates a criterion for selecting an object as a display target, when curvature information is greater than or equal to a specified curvature value, in an object display apparatus or an object display method;

FIG. 5 illustrates a table indicating a sorting order according to longitudinal position information of an object, in an object display apparatus or an object display method;

DETAILED DESCRIPTION

Figure 1:
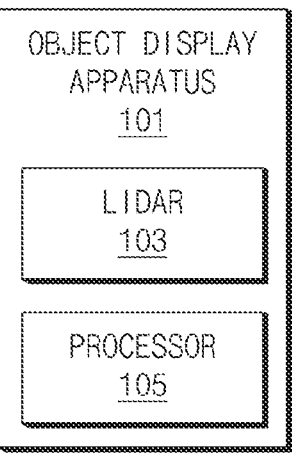
FIG. 1 is a block diagram illustrating an object display apparatus.

Hereinafter, one or more example embodiments of the present disclosure will be described in detail with reference to the exemplary drawings. In the drawings, the same reference numerals will be used throughout to designate the same or equivalent components. In addition, a detailed description of well-known features or functions will be ruled out in order not to unnecessarily obscure the gist of the present disclosure.

In describing components of one or more example embodiments of the present disclosure, the terms first, second, A, B, (a), (b), and the like may be used herein. These terms are only used to distinguish one component from another component, but do not limit the corresponding components irrespective of the order or priority of the corresponding components. Furthermore, unless otherwise defined, all terms including technical and scientific terms used herein are to be interpreted as is customary in the art to which this present disclosure belongs. It will be understood that terms used herein should be interpreted as having a meaning that is consistent with their meaning in the context of this present disclosure and the relevant art and will not be interpreted in an idealized or overly formal sense unless expressly so defined herein.

The terms " . . . device". " . . . unit", " . . . thing", and " . . . body' used hereinafter may refer to at least one shape structure or refer to a unit for processing a function.

Furthermore, the expression "greater than" or "less than" is used to determine whether a specific condition is satisfied or fulfilled, but is only to represent an example and does not exclude the description "greater than or equal to" or "less than or equal to". A condition described as being "greater than or equal to" may be replaced with a condition described as being "greater than", a condition describing as being "less than or equal to" may be replaced with a condition described as being "less than", and a condition described as being "greater than or equal to and less than" may be replaced with "greater than and less than or equal to". Furthermore, hereinafter, the expression "A to B" refers to at least one of elements (including B) from A to B (including A).

Hereinafter, one or more example embodiments of the present disclosure will be described in detail with reference to FIGS. 1 to 9.

FIG. 1 is a block diagram illustrating an object display apparatus.

Referring to FIG. 1, an object display apparatus 101 may be implemented in a vehicle. In this case, the object display apparatus 101 of the vehicle may be integrally configured with control units in the vehicle or may be implemented as a separate device to be connected with the control units of the vehicle by a separate connection means.

Referring to FIG. 1, the object display apparatus 101 may include LiDAR 103 and a processor 105.

The processor 105 of the object display apparatus 101 may obtain position information about points of an object around the vehicle including the object display apparatus 101 by means of the LiDAR 103. The processor 105 of the object display apparatus 101 may obtain a point cloud indicating the object by means of the LiDAR 103. The processor 105 of the object display apparatus 101 may identify contour points among points included in the point cloud.

The processor 105 of the object display apparatus 101 may identify position information of a point corresponding to the object based on the contour points indicating the object. For example, the point corresponding to the object may include a center point for the most preceding segment in the direction of progress of the object among segments constituting an object box including the contour points indicating the object or may include a center point for a rearmost segment in the direction of progress of the object. The center point may be referred to as, but not limited to, a tracking point. For example, the point corresponding to the object may include, but is not limited to, a rightmost point among the contour points included in the object box. For example, the point corresponding to the object may include, but is not limited to, a leftmost point among the contour points included in the object box.

The processor 105 of the object display apparatus 101 may fail to obtain a point cloud during a specified time (e.g., within a specific time window). When the point cloud is not obtained during the specified time, the processor 105 of the object display apparatus 101 may obtain a code indicating a specified error. A specific failure may occur based on the specified error. For example, the specified error may cause a worst-case execution time (WCET) failure. The WCET failure may occur, when the point cloud is not obtained during the specified time (e.g., within a specified time window).

The processor 105 of the object display apparatus 101 needs to display information about an object identified in a previous frame (e.g., data frame, image frame, etc.) to reduce a risk of an accident and improve user experience, even when the code indicating the specified error is obtained. This is because an accident may occur as the host vehicle does not recognize an object, when the processor 105 of the object display apparatus 101 does not display objects located near the host vehicle.

To reduce a risk of an accident in autonomous driving or driving using a driving aid may be more important than reducing the risk of the accident in a general driving vehicle. This is because a possibility that the driver's defense mechanism may intervene in the autonomous driving or the driving using the driving aid is smaller than a possibility that the driver's defense mechanism may intervene in general driving, when an accident occurs. Furthermore, to increase safety in the autonomous driving or the driving using the driving aid may be associated with increasing the reliability of a user for the autonomous driving or the driving using the driving aid.

Thus, the processor 105 of the object display apparatus 101 needs to display information about an object identified in a previous frame (e.g., data frame, image frame, etc.), although information about the object is not obtained in a specific frame.

However, when the processor 105 of the object display apparatus 101 displays information about all objects identified in the previous frame in the specific frame subsequent to the previous frame, the accuracy of a position of the object may be small. Thus, the processor 105 of the object display apparatus 101 may select only an object, importance of which is greater than or equal to specified importance, as a display target.

Hereinafter, in FIG. 2, a description will be given of contents for a method for identifying a priority according to an importance of an object and selecting the object as a display target depending to the priority of the object.

Hereinafter, in FIGS. 3 and 5, a description will be given of contents for a method for assigning a priority depending to an importance of the object.

FIG. 2 illustrates flow of an operation of an object display apparatus for selecting a referenced table depending on curvature information, in an object display apparatus or an object display method.

Hereinafter, it is assumed that an object display apparatus 101 of FIG. 1 performs a process of FIG. 2. Furthermore, in a description of FIG. 2, an operation described as being performed by a processor of an object display apparatus may be understood as being controlled by a processor 105 of the object recognition apparatus 101.

Referring to FIG. 2, in first operation 201, the processor of the object display apparatus may identify whether curvature information of a path on which a host vehicle drives is greater than or equal to a specified curvature value. When the curvature information of the path on which the host vehicle drives is less than to the specified curvature value, the processor of the object display apparatus may perform second operation 203. When the curvature information of the path on which the host vehicle drives is greater than or equal the specified curvature value, the processor of the object display apparatus may perform third operation 205. The curvature information may indicate the curvature information of the path on which the host vehicle operates.

The processor of the object display apparatus may identify whether the host vehicle is traveling on a straight course or a curved course, depending on the curvature information.

In second operation 203, the processor of the object display apparatus may identify any one group including an object among a plurality of groups, based on a table indicating a criterion according to the straight course. A table according to the straight course and a table according to the curved course may be different from each other.

The processor of the object display apparatus may identify whether longitudinal position information indicates a longitudinal position value smaller than a specified longitudinal position value. The processor of the object display apparatus may identify a group including the object, based on that lane information, longitudinal position information, lateral position information, classification information, number information, and size information satisfy specified conditions and that the longitudinal position value is smaller than the specified longitudinal position value.

The specified longitudinal position value may be identified as a first specified longitudinal position value, based on that the curvature information is less than the specified curvature value.

In third operation 205, the processor of the object display apparatus may identify any one group including the object among the plurality of groups, based on a table indicating a criterion according to the curved course.

As when performing second operation 203, the processor of the object display apparatus may identify the group including the object, based on that the lane information, the longitudinal position information, the lateral position information, the classification information, the number information, and the size information satisfy the specified conditions and that the longitudinal position value is smaller than the specified longitudinal position value.

The specified position value may be identified as a second specified longitudinal position value smaller than the first specified longitudinal position value, based on that the curvature information is greater than or equal to the specified curvature value.

The is because an error between a position of the object in a first frame before obtaining the code indicating the specified error and a position of the object in a second frame after obtaining the code indicating the specified error when the curvature information is greater than or equal to the specified curvature value may be greater than an error between a position of the object in the first frame and a position of the object in the second frame when the curvature information is less than the specified curvature value.

In fourth operation 207, the processor of the object display apparatus may sort the object and at least one other object included in the any one group in ascending order or descending order.

The processor of the object display apparatus may sort a priority of an object with longitudinal position information closer to the longitudinal position information (e.g., the origin) of the host vehicle among the at least one object included in any one group to be ahead of a priority of an object with longitudinal position information farther than the longitudinal position information of the host vehicle.

In other words, the processor of the object display apparatus may identify coordinates of a point corresponding to the host vehicle as the origin. The processor of the object display apparatus may sort an object with first longitudinal position indicating a first longitudinal position value between at least one other object included in the any one group and the object in a first priority. The processor of the object display apparatus may sort an object with second longitudinal position information indicating a second longitudinal position value smaller than the first longitudinal position value in a second priority ahead of the first priority.

In fifth operation 209, the processor of the object display apparatus may identify a priority of the object among all objects identified in a first frame, based on a priority of the group and the sorted result.

The processor of the object display apparatus may identify a priority of the object among all the objects identified in the first frame, based on a priority of the group including the object and the result in which the object is sorted in the group. For example, when the priority of the group including the object is rank 1 and when the object is sorted in a second order in the group, the priority of the object may be rank 2. For example, when the priority of the group including the object is rank 2, when the object is sorted in a third order in the group, and when the number of other objects included in a rank 1 group is 1, the priority of the object may be rank 4.

In sixth operation 211, the processor of the object display apparatus may select the object as a display target in a second frame, based on the specified priority.

The processor of the object display apparatus may select the object as the display target in the second frame included in a time after obtaining the code indicating the specified error, based on identifying that the priority of the object is ahead of a specified priority. The specified priority may refer to a threshold priority of the object to be selected as the display target.

For example, when the priority of the object is rank 4 and when the specified priority is rank 3, and the object in rank 4 may not be selected as the display target. For example, when the priority of the object is rank 2 and when the specified priority is rank 3, and the object in rank 2 may be selected as the display target.

The processor of the object display apparatus may identify a speed of the host vehicle and may set the specified priority to be lowered as the speed of the host vehicle increases. In other words, the specified priority and the speed of the host vehicle may have a correlation in which the specified priority is lowered as the speed of the host vehicle increases (e.g., an inverse correlation). This is because there is a need to display more objects because there is a high probability of colliding with more objects as the host vehicle is quick.

The processor of the object display apparatus may identify whether to select an object as the display target on the basis of the priority of the group. Hereinafter, a description will be given of contents for priority which is a criterion of whether to select the object as the display target.

The processor of the object display apparatus may select an object identified as a pedestrian, a preceding vehicle located in a lane where the host vehicle is located, or a preceding vehicle located in a lane next to the lane where the host vehicle is located as the display target regardless of priority. In other words, the processor of the object display apparatus may identify that the object is located in the lane where the host vehicle is located or one of both lanes next to the lane, based on lateral position information, and may identify that the object is classified as one of a pedestrian or a preceding vehicle, based on classification information. The processor of the object display apparatus may select the object as the display target in the second frame included in the time after obtaining the code indicating the specified error, based on identifying that the object is classified as the pedestrian or identifying that the object is classified as the preceding vehicle located in the lane where the host vehicle is located or the one of both the next lanes. This is because the importance of the pedestrian, the preceding vehicle located in the lane where the host vehicle is located, or the preceding vehicle located in the lane next to the lane where the host vehicle is located is greater than the importance of an object identified as a thing rather than the pedestrian, the preceding vehicle located in the lane where the host vehicle is located, or the preceding vehicle located in the lane next to the lane where the host vehicle is located.

The processor of the object display apparatus may select the pedestrian as the display target regardless of priority, in a section (e.g., area) that is not a highway (e.g., not a freeway). The processor of the object display apparatus may obtain a signal indicating that the host vehicle is located in an area that is not a highway. The processor of the object display apparatus may identify that the object is classified as the pedestrian, based on classification information of the object. The processor of the object display apparatus may select the object as the display target in the second frame included in the time after obtaining the code indicating the specified error, based on obtaining the signal or identifying that the object is classified as the pedestrian.

This is because the importance of the object classified as the pedestrian in an area that is not a highway is greater than the importance of the object identified as the thing rather than the pedestrian.

FIG. 3 illustrates a criterion for selecting an object as a display target, when curvature information is less than a specified curvature value, in an object display apparatus or an object display method.

Referring to FIG. 3, in situation 301, a processor of the object display apparatus may identify a first object 305, a second object 307, a third object 309, and a fourth object 311, which are located around a host vehicle 303. A table 321 may be referenced to identify whether an object corresponds to a display target in a straight driving situation.

The processor of the object display apparatus may identify that the host vehicle 303 including the object display apparatus is traveling in a straight line, based on that curvature information indicating a curvature of a path on which the host vehicle 303 operates is less than a specified curvature value. In situation 301, the host vehicle 303 may be traveling in a straight line.

The processor of the object display apparatus may identify whether the object is included in any one group among a plurality of groups divided according to an importance of the object, based on that at least one of lane information, longitudinal position information, lateral position information, classification information, number information, or size information, or any combination thereof satisfying a specified condition.

The processor of the object display apparatus may identify whether the object is included in the any one group, based on that the longitudinal position information satisfies the specified condition.

The processor of the object display apparatus may identify whether the object is included in the any one group, based on that the lane information or the size information satisfies the specified condition.

The lane including the object may be identified as what rank the lane is, depending on how far the lane including the object is from the lane including the host vehicle. For example, the lane including the host vehicle may be a rank 1 lane. Both lanes next to the lane including the host vehicle may be rank 2 lanes. A lane spaced apart from the lane including the host vehicle by one lane may be a rank 3 lane. A lane spaced apart from the lane including the host vehicle by two lanes may be a rank 4 lane. An area spaced apart from the lane including the host vehicle by three or more lanes may be a rank 5 lateral position. The processor of the object display apparatus may fail to determine which lane the object located at the rank 5 lateral position is in.

For example, the first object 305 may be located in a lane including the host vehicle 303 (e.g., a rank 1 lane in situation 301). The third object 309 may be located in a lane next to the lane including the host vehicle 303 (e.g., a rank 2 lane in situation 301).

Thus, because the first object 305 is included in the rank 1 lane and a length of a longer segment among a length of a longitudinal segment of an object box including the first object 305 and a length of a lateral segment of the object box is greater than or equal to a specified length (e.g., about 1.5 m), referring to a table 321, the first object 305 may be included in group 13. Referring to a table 321, a priority of group 13 may be rank 1.

Thus, because the third object 309 is included in the rank 2 lane and a length of a longer segment among a length of a longitudinal segment of an object box including the third object 309 and a length of a lateral segment of the object box is greater than or equal to the specified length (e.g., about 1.5 m), referring to the table 321, the third object 309 may be included in group 12. Referring to the table 321, a priority of group 12 may be rank 2.

The processor of the object display apparatus may identify an object located in a lane close to the lane where the host vehicle 303 is located to be included in a group with a higher priority. For example, the processor of the object display apparatus may identify a priority of any one group including an object with first lane information indicating a first lane as a first priority. The processor of the object display apparatus may identify a priority of any one group including an object with second lane information indicating a second lane as a second priority ahead of the first priority. A distance between the first lane and the lane where the host vehicle 303 is located may be greater than a distance between the second lane and the lane where the host vehicle 303 is located.

The processor of the object display apparatus may identify whether the object is included in the any one group, based on that the classification information satisfies the specified condition.

For example, the second object 307 may be located in a line of a lane next to the lane including the host vehicle 303 (e.g., a rank 2 lane in situation 301). The processor of the object display apparatus may classify the second object 307 as a pedestrian. Because the second object 307 is classified as the pedestrian, referring to the table 321, the second object 307 may be included in group 13. Referring to the table 321, a priority of group 13 may be rank 1.

The processor of the object display apparatus may identify whether the object is included in the any one group, based on that the size information satisfies the specified condition.

For example, because the fourth object 311 is included in the rank 1 lane and a length of a longer segment among a length of a longitudinal segment of an object box including the fourth object 311 and a length of a lateral segment of the object box is less than the specified length (e.g., about 1.5 m), referring to the table 321, the fourth object 311 may be included in group 13. Referring to the table 321, the fourth object 311 may be included in group 9. Referring to the table 321, a priority of group 9 may be rank 5.

The processor of the object display apparatus may select the object as a display target, based on the priority of the specified group.

For example, the processor of the object display apparatus may select only objects included in a group with a priority of rank 1 or more as display targets. The group with the priority of rank 1 or more (e.g., group 13 in the table 321) may include the first object 305 and the second object 307. Thus, in situation 301, the first object 305 and the second object 307 may be selected as display targets.

If the object is classified as the pedestrian or is located in the rank 1 lane and when the length of the longer segment between the length of the longitudinal segment of the object box including the object and the length of the lateral segment of the object box is greater than or equal to the specified length (e.g., about 1.5 m), the processor of the object display apparatus may identify that the object is included in group 13 with rank 1.

If the length of the longer segment between the length of the longitudinal segment of the object box including the object and the length of the lateral segment of the object box is greater than or equal to about 20 m or when the object is classified as a road boundary or is located in the rank 2 lane, and when the length of the longer segment between the length of the longitudinal segment of the object box including the object and the length of the lateral segment of the object box is greater than or equal to the specified length (e.g., about 1.5 m), the processor of the object display apparatus may identify that the object is included in group 12 with rank 2.

If the object is identified as a pole located in the rank 1 lane or the rank 2 lane (e.g., a pole of traffic lights or a pole for supporting a road sign), the processor of the object display apparatus may identify that the object is included in group 11 with rank 3.

If the object is located in the rank 3 lane and when the length of the longer segment between the length of the longitudinal segment of the object box including the object and the length of the lateral segment of the object box is greater than or equal to the specified length (e.g., about 1.5 m), the processor of the object display apparatus may identify that the object is included in group 10 with rank 4.

If the object is located in the rank 1 lane or the rank 2 lane and when the length of the longer segment between the length of the longitudinal segment of the object box including the object and the length of the lateral segment of the object box is less than to the specified length (e.g., about 1.5 m), the processor of the object display apparatus may identify that the object is included in group 9 with rank 5.

If the object is located in the rank 4 lane and when the length of the longer segment between the length of the longitudinal segment of the object box including the object and the length of the lateral segment of the object box is greater than or equal to the specified length (e.g., about 2 m), the processor of the object display apparatus may identify that the object is included in group 8 with rank 6.

If the object is located at the rank 5 lateral position and when the length of the longer segment between the length of the longitudinal segment of the object box including the object and the length of the lateral segment of the object box is greater than or equal to the specified length (e.g., about 4 m), the processor of the object display apparatus may identify that the object is included in group 7 with rank 7.

If the object is located at the rank 3 lateral position and when the length of the longer segment between the length of the longitudinal segment of the object box including the object and the length of the lateral segment of the object box is less than the specified length (e.g., about 1.5 m), the processor of the object display apparatus may identify that the object is included in group 6 with rank 8.

If the object is located in the rank 4 lane and when the length of the longer segment between the length of the longitudinal segment of the object box including the object and the length of the lateral segment of the object box is less than the specified length (e.g., about 2 m), the processor of the object display apparatus may identify that the object is included in group 5 with rank 9.

If the object is located at the rank 5 lateral position and when the lateral position of the object is within the specified length (e.g., about 17 m) from the lateral position of the host vehicle, the processor of the object display apparatus may identify that the object is included in group 4 with rank 10.

If the object is located at the rank 5 lateral position and when the lateral position of the object is out of the specified length (e.g., about 17 m) from the lateral position of the host vehicle or when the lateral position of the object is out of the specified distance (e.g., about 80 m), the processor of the object display apparatus may identify that the object is included in group 3 with rank 11.

If the object is located at the rank 5 lateral position and when the lateral position of the object is out of the specified length (e.g., about 30 m) from the lateral position of the host vehicle, the processor of the object display apparatus may identify that the object is included in group 2 with rank 12.

If the object is located in lanes of ranks 1 to 4 or at the rank 5 lateral position and when the number of contour points in the object box is less than 5, the processor of the object display apparatus may identify that the object is included in group 1 with rank 13.

FIG. 4 illustrates a criterion for selecting an object as a display target, when curvature information is greater than or equal to a specified curvature value, in an object display apparatus or an object display method. Referring to FIG. 4, in situation 401, a processor of the object display apparatus may identify a first object 405, a second object 407, a third object 409, and a fourth object 411, which are located around a host vehicle 403. A table 421 may be referenced to identify whether an object corresponds to a display target in a curved driving situation.

A table (e.g., a table 321 of FIG. 3) referenced to select a display target in a straight course and a table (e.g., the table 421 of FIG. 4) referenced to select a display target in a curved course may be different from each other.

The processor of the object display apparatus may identify whether longitudinal position information indicates a longitudinal position value smaller than a specified longitudinal position value. The processor of the object display apparatus may identify a group including an object, based on that at least one of lane information, longitudinal position information, lateral position information, classification information, number information, or size information, or any combination thereof satisfying a specified condition and that a longitudinal position value indicated by the longitudinal position information of the object is smaller than a specified longitudinal position value.

The specified longitudinal position value may be identified as a first specified longitudinal position value (e.g., about 80 m from the host vehicle 403), based on that curvature information is less than a specified curvature value. The specified longitudinal position value may be identified as a second specified longitudinal position value smaller than the first specified longitudinal position value (e.g., about 60 m from the host vehicle 403), based on that the curvature information is greater than or equal to the specified curvature value.

The processor of the object display apparatus may identify the group including the object, based on that the at least one of the lane information, the longitudinal position information, the lateral position information, the classification information, the number information, or the size information, or the any combination thereof satisfies the specified condition and that the longitudinal position value is smaller than the specified longitudinal position value.

The processor of the object display apparatus may identify that the host vehicle 403 including the object display apparatus is traveling on a curve, based on that curvature information indicating that a curvature of a path on which the host vehicle 403 operates is greater than or equal to a specified curvature value. In situation 401, the host vehicle 403 may be traveling on a curve.

The processor of the object display apparatus may identify whether the object is included in any one group among a plurality of groups divided according to an importance of the object, based on that the at least one of the lane information, the longitudinal position information, the lateral position information, the classification information, the number information, or the size information, or any combination thereof satisfies the specified condition.

The processor of the object display apparatus may identify whether the object is included in the any one group, based on that the longitudinal position information satisfies the specified condition (e.g., a condition in which longitudinal position information of the object and longitudinal position information of the host vehicle are less than or equal to about 60 m).

The processor of the object display apparatus may identify whether the object is included in the any one group, based on that the lane information or the size information satisfies the specified condition.

For example, because the first object 405 is included in a rank 1 lane and a length of a longer segment among a length of a longitudinal segment of an object box including the first object 405 and a length of a lateral segment of the object box is greater than or equal to a specified length (e.g., about 1.5 m), referring to the table 421, the first object 405 may be included in group 13. Referring to the table 421, a priority of group 13 may be rank 1.

For example, because the third object 409 is included in a rank 2 lane and a length of a longer segment among a length of a longitudinal segment of an object box including the third object 409 and a length of a lateral segment of the object box is greater than or equal to the specified length (e.g., about 1.5 m), referring to the table 421, the third object 409 may be included in group 12. Referring to the table 421, a priority of group 12 may be rank 2.

The processor of the object display apparatus may identify whether the object is included in the any one group, based on that the classification information satisfies the specified condition.

For example, because the second object 407 is classified as a pedestrian, referring to the table 421, the second object 407 may be included in group 13. Referring to the table 421, a priority of group 13 may be rank 1.

The processor of the object display apparatus may identify whether the object is included in the any one group, based on that the longitudinal position information satisfies the specified condition.

For example, because a lateral direction indicated by lateral position information of the fourth object 411 is greater than a specified lateral distance value (e.g., about 60 m), the processor of the object display apparatus may fail to identify whether the fourth object 411 is a display target.

The processor of the object display apparatus may select the object as a display target, based on the priority of the specified group.

For example, the processor of the object display apparatus may select only objects included in a group with a priority of rank 1 or more as display targets. The group with the priority of rank 1 or more (e.g., group 13 in the table 421) may include the first object 405 and the second object 407. Thus, in situation 401, the first object 405 and the second object 407 may be selected as display targets.

In the table 421 referenced when the host vehicle 403 is traveling on the curve and the table (e.g., the table 321 of FIG. 3) referenced when the host vehicle 403 is traveling on the curve, a condition of an object included in group 7 and a condition of an object included in group 3 may be different from each other. Because the table 421 has the same contents as the table 321, except for added conditions in groups 7 and 3, hereinafter, duplicated contents will be omitted.

Compared to a condition of an object included in group 7 of the table 321, the condition of the object added to group 7 in the table 421 may include a condition for an object, which is out of about 60 m in a longitudinal direction, in which the size of the object box is greater than or equal to about 4 m.

An object located in a position which is greater than or equal to about 60 m in a longitudinal direction may be identified, even when the host vehicle 403 is traveling on the curve. The object in which the size of the object box is greater than or equal to about 4 m may refer to an object in which a length of a longer segment among a length of a longitudinal segment of the object box and a length of a lateral segment of the object box is greater than or equal to about 4 m.

Compared to a condition of an object included in group 7 of the table 321, the condition of the object added to group 3 in the table 421 may include a condition for an object, which is out of about 60 m in a longitudinal direction, in which the object box is less than about 4 m.

The object in which the size of the object box is less than about 4 m may refer to an object in which a length of a longer segment among a length of a longitudinal segment of the object box and a length of a lateral segment of the object box is less than about 4 m.

FIG. 5 illustrates a table indicating a sorting order according to longitudinal position information of an object, in an object display apparatus or an object display method.

Referring to FIG. 5, a table 501 may indicate a priority 503 of a group including an object, an object identifier (ID) 505, a longitudinal position 507 of the object, and a priority 509 of the object.

A processor of an object display apparatus may refer to tables of FIGS. 3 and 4 to identify a group including an object. For example, the processor of the object display apparatus may identify the priority 503 of the group including objects with the object ID 505. For example, an object, the object ID 505 of which is 11, and an object, the object ID 505 of which is 1, may be included in a group, a priority of which is rank 1. For example, an object, the object ID 505 of which is 12, may be included in a group, a priority of which is rank 2. For example, an object, the object ID 505 of which is 13, an object, the object ID 505 of which 14, and an object, the object ID 505 of which is 2, may be included in a group, a priority of which is rank 3. For example, an object, the object ID 505 of which is 3, and an object, the object ID 505 of which is 15, may be included in a group, a priority of which is rank 4. For example, an object, the object ID 505 of which is 5, and an object, the object ID 505 of which is 4, may be included in a group, a priority of which is rank 5. For example, an object, the object ID 505 of which is 6, may be included in a group, a priority of which is rank 6. For example, an object, the object ID 505 of which is 7, and an object, the object ID 505 of which is 8, may be included in a group, a priority of which is rank 7. For example, an object, the object ID 505 of which is 10, and an object, the object ID 505 of which is 9, may be included in a group, a priority of which is rank 8.

The processor of the object display apparatus may sort objects in the same group, depending on the longitudinal position 507 of the object. For example, the processor of the object display apparatus may sort an object, the object ID 505 of which is 11, and an object, the object ID 505 of which is 1, which are included in the group with rank 1, in ascending order depending on the longitudinal position. For example, the processor of the object display apparatus may sort an object, the object ID 505 of which is 13, an object, the object ID 505 of which is 14, and an object, the object ID 505 of which is 2, which are included in the group with rank 3, in ascending order depending on the longitudinal position. For example, the processor of the object display apparatus may sort an object, the object ID 505 of which is 3, and an object, the object ID 505 of which is 15, which are included in the group with rank 4, in ascending order depending on the longitudinal position. For example, the processor of the object display apparatus may sort an object, the object ID 505 of which is 5, and an object, the object ID 505 of which is 4, which are included in the group with rank 5, in ascending order depending on the longitudinal position. For example, the processor of the object display apparatus may sort an object, the object ID 505 of which is 6, which is included in the group with rank 6, in ascending order depending on the longitudinal position. For example, the processor of the object display apparatus may sort an object, the object ID 505 of which is 7, and an object, the object ID 505 of which is 8, which are included in the group with rank 7, in ascending order depending on the longitudinal position. For example, the processor of the object display apparatus may sort an object, the object ID 505 of which is 10, and an object, the object ID 505 of which is 9, which are included in the group with rank 8, in ascending order depending on the longitudinal position.

The processor of the object display apparatus may identify the priority 509 of the object, based on the priority 503 of the group and the result sorted according to and the longitudinal position 507.

For example, when the object, the object ID 505 of which is 11, which is included in the group with rank 1, is first sorted in ascending order by the processor of the object display apparatus, the priority of the object, the object ID 505 of which is 11, may be rank 1. For example, when the object, the object ID 505 of which is 1, which is included in the group with rank 2, is sorted second in ascending order by the processor of the object display apparatus, the priority of the object, the object ID 505 of which is 1, may be rank 2.

When identified in such a method, the priority of the object, the object ID 505 of which is 12, may be rank 3. The priority of the object, the object ID 505 of which is 13, may be rank 4. The priority of the object, the object ID 505 of which is 14, may be rank 5. The priority of the object, the object ID 505 of which is 2, may be rank 6. The priority of the object, the object ID 505 of which is 3, may be rank 7. The priority of the object, the object ID 505 of which is 15, may be rank 8. The priority of the object, the object ID 505 of which is 5, may be rank 9. The priority of the object, the object ID 505 of which is 4, may be rank 10. The priority of the object, the object ID 505 of which is 6, may be rank 11. The priority of the object, the object ID 505 of which is 7, may be rank 12. The priority of the object, the object ID 505 of which is 8, may be rank 12. The priority of the object, the object ID 505 of which is 10, may be rank 14. The priority of the object, the object ID 505 of which is 9, may be rank 15.

Figure 6:
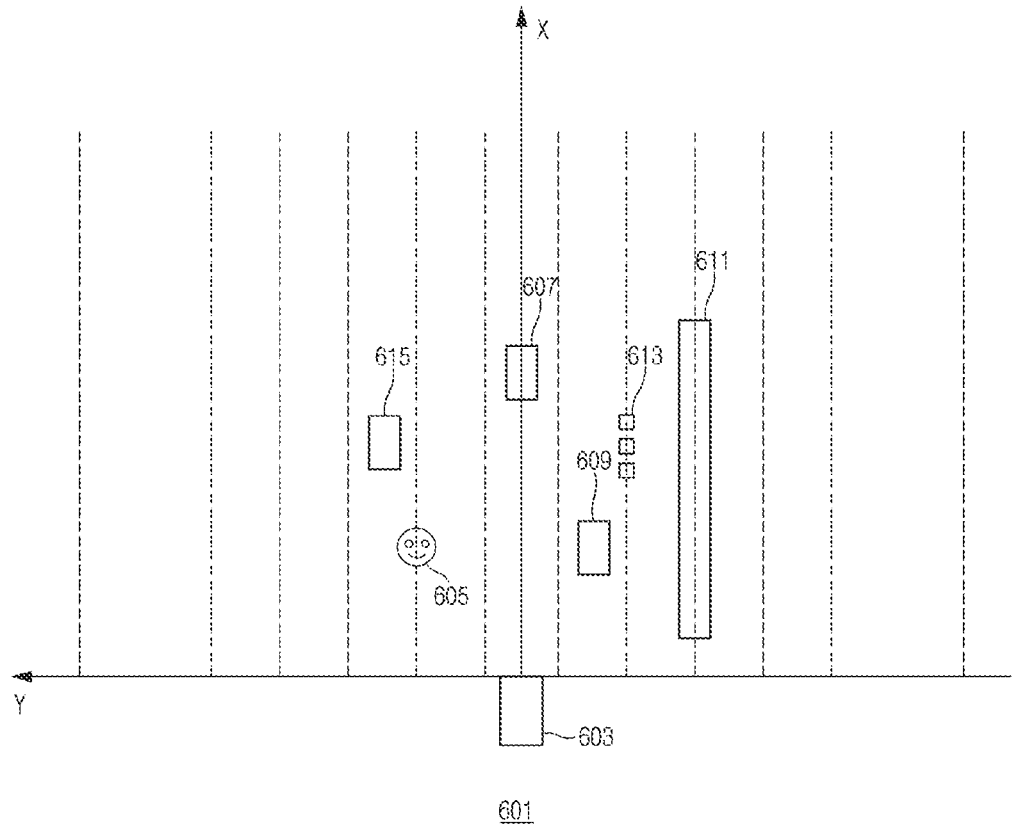
FIG. 6 illustrates an example of an object selected as a display target according to priority, in an object display apparatus or an object display method.

FIG. 6 illustrates an example of an object selected as a display target according to priority, in an object display apparatus or an object display method.

Referring to FIG. 6, in situation 601, a processor of the object display apparatus may identify a host vehicle 603, a first object 605, a second object 607, a third object 609, a fourth object 611, a fifth object 613, and a sixth object 615. In situation 601, curvature information indicating a curvature of a path on which the host vehicle 603 including the object display apparatus travels may be less than a specified curvature value.

The first object 605 may be classified as a pedestrian. Thus, the first object 605 may be identified as being included in a group with rank 1, with reference to a table (e.g., a table 321 of FIG. 3) referenced when the host vehicle 603 is traveling in a straight line.

Because the second object 607 is included in the same lane as a lane where the host vehicle 603 is located and a length of a longer segment among a length of a longitudinal segment of an object box including the second object 607 and a length of a lateral segment of the object box is greater than or equal to a specified length (e.g., about 1.5 m), the second object 607 may be identified as being included in the group with rank 1.

Because the third object 609 is included in both lanes next to the lane where the host vehicle 603 is located and a length of a longer segment among a length of a longitudinal segment of an object box including the third object 609 and a length of a lateral segment of the object box is greater than or equal to the specified length (e.g., about 1.5 m), the third object 609 may be identified as being included in a group with rank 2.

For example, because a length of a longer segment among a length of a longitudinal segment of an object box including the fourth object 611 and a length of a lateral segment of the object box is greater than or equal to the specified length (e.g., about 20 m), the fourth object 611 may be identified as being included in the group with rank 2.

The fifth object 613 may be classified as a pole located in the lane where the host vehicle 603 is located or a lane next to the lane where the host vehicle 603 is located. The pole may be referred to as a traffic pole, but example embodiments of the present disclosure may not be limited thereto. The fifth object 613 may be identified as being included in a group with rank 3, with reference to the table (e.g., the table 321 of FIG. 3) referenced when the host vehicle 603 is traveling in a straight line.

Because the sixth object 615 is included in a lane next to a lane next to the lane where the host vehicle 603 is located and a length of a longer segment among a length of a longitudinal segment of an object box including the sixth object 615 and a length of a lateral segment of the object box is greater than or equal to the specified length (e.g., about 1.5 m), the sixth object 615 is included in a group with rank 4.

The processor of the object display apparatus may sort the first object 605 and the second object 607, which are included in the group with rank 1, based on longitudinal position information. For example, when the host vehicle 603 becomes the origin, because a longitudinal position value indicated by longitudinal position information of the first object 605 is closer than a longitudinal position value indicated by longitudinal position information of the second object 607, the processor of the object display apparatus may sort the first object 605 and the second object 607 in an order of the first object 605 and the second object 607, in the group with rank 1.

The processor of the object display apparatus may sort the third object 609 and the fourth object 611, which are included in the group with rank 2, based on longitudinal position information. For example, when the host vehicle 603 becomes the origin, because a longitudinal position value indicated by longitudinal position information of the third object 609 is closer than a longitudinal position value indicated by longitudinal position information of the fourth object 611, the processor of the object display apparatus may sort the third object 609 and the fourth object 611 in an order of the fourth object 611 and the third object 609, in the group with rank 2. However, when a representative point of the object for identifying the longitudinal position information of the object varies, a sorting order of the third object 609 and the fourth object 611 may vary.

Because only the fifth object 613 is included in the group with rank 3, the processor of the object display apparatus may sort the fifth object 613.

Because only the sixth object 615 is included in the with rank 4, the processor of the object display apparatus may sort the sixth object 615.

The processor of the object display apparatus may identify priorities of objects, based on the priority of the group and the sorted result. For example, the priority of the first object 605 among all objects included in a first frame before obtaining a code indicating a specified error may be rank 1. For example, the priority of the second object 607 among all the objects may be rank 2. For example, the priority of the fourth object 611 among all the objects may be rank 3. For example, the priority of the third object 609 among all the objects may be rank 4. For example, the priority of the fifth object 613 among all the objects may be rank 5. For example, the priority of the sixth object 615 among all the objects may be rank 6.

The processor of the object display apparatus may select all of objects, each of which has a priority ahead of rank 6 which is a specified priority, as display targets.

Thus, the first object 605, the second object 607, the third object 609, the fourth object 611, and the fifth object 613 may be selected as display targets. The sixth object 615 may be identified as an object which is not the display target.

Figure 7:
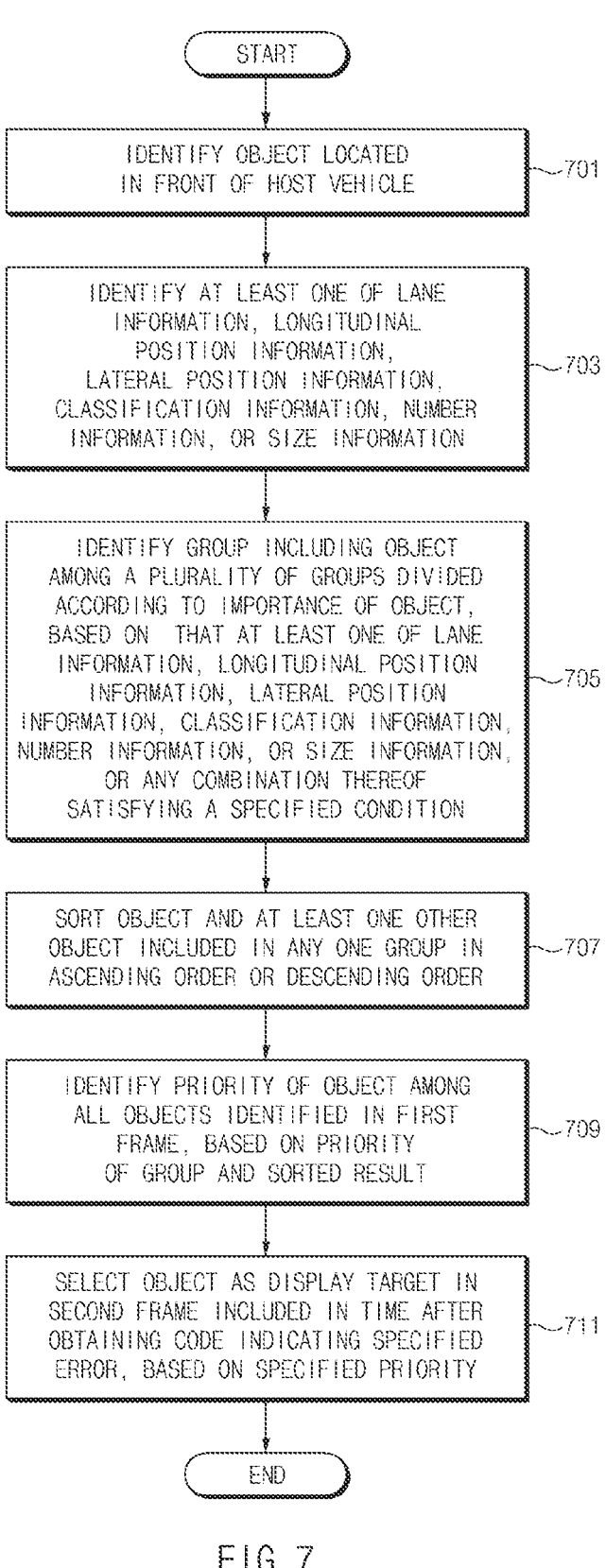
FIG. 7 illustrates flow of an operation of an object display apparatus for selecting an object as a display target, in an object display apparatus or an object display method.

FIG. 7 illustrates flow of an operation of an object display apparatus for selecting an object as a display target, in an object display apparatus or an object display method.

Hereinafter, it is assumed that an object display apparatus 101 of FIG. 1 performs a process of FIG. 7. Furthermore, in a description of FIG. 7, an operation described as being performed by a processor of an object display apparatus may be understood as being controlled by a processor 105 of the object recognition apparatus 101.

Referring to FIG. 7, in first operation 701, the processor of the object display apparatus may identify an object located in front of a host vehicle.

In second operation 703, the processor of the object display apparatus may identify at least one of lane information, longitudinal position information, lateral position information, classification information, or number information, or size information.

In third operation 705, the processor of the object display apparatus may identify a group including the object among a plurality of groups divided according to an importance of the object, based on that at least one of the lane information, the longitudinal position information, the lateral position information, the classification information, the number information, or the size information, or any combination thereof satisfying a specified condition.

In fourth operation 707, the processor of the object display apparatus may sort the object and at least one other object included in any one group in ascending order or descending order.

In fifth operation 709, the processor of the object display apparatus may identify a priority of the object among all objects identified in a first frame, based on a priority of the group and the sorted result.

In sixth operation 711, the processor of the object display apparatus may select the object as a display target in a second frame included in a time after obtaining a code indicating a specified error, based on the specified priority.

Figure 8:
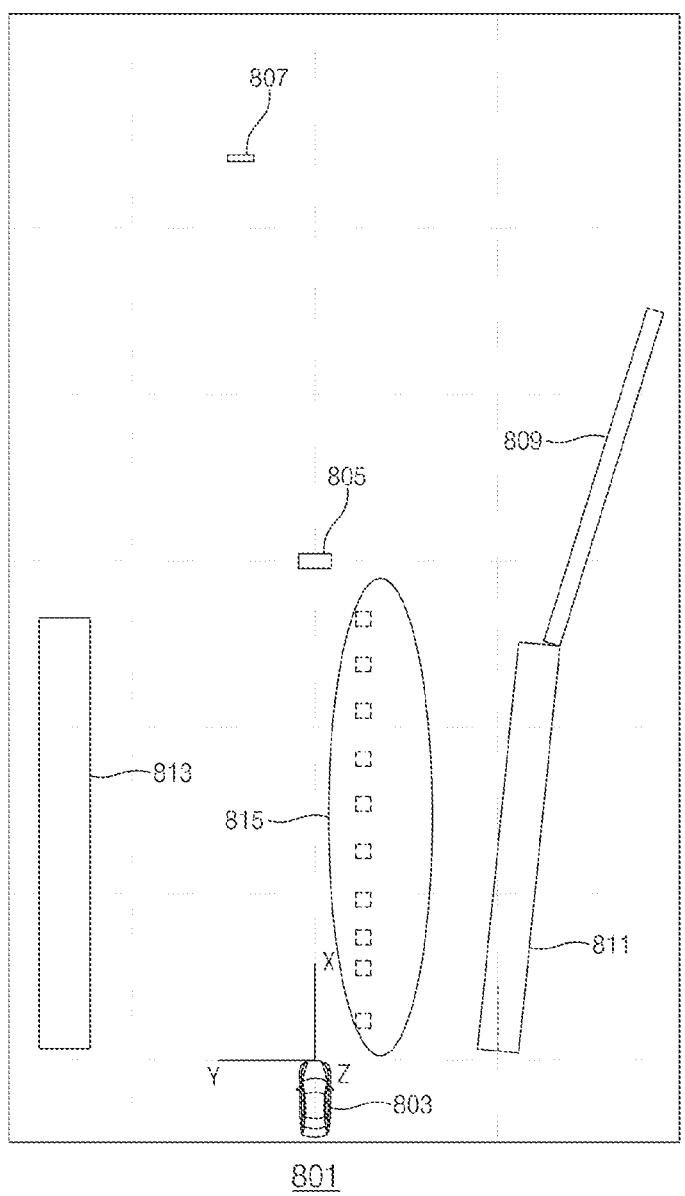
FIG. 8 illustrates an example of an object which varies with whether it is a display target according to a specified priority, in an object display apparatus or an object display method.

FIG. 8 illustrates an example of an object which varies with whether it is a display target according to a specified priority, in an object display apparatus or an object display method.

Referring to FIG. 8, in situation 801, a processor of the object display apparatus may identify a host vehicle 803, a first object 805, a second object 807, a third object 809, a fourth object 811, a fifth object 813, and a sixth object 815. In situation 801, curvature information indicating a curvature of a path on which the host vehicle 803 including the object display apparatus travels may be less than a specified curvature value.

The processor of the object display apparatus may identify whether the object is included in any one group among a plurality of groups divided according to an importance of the object, based on that at least one of lane information, longitudinal position information, lateral position information, classification information, number information, or size information, or any combination thereof satisfying a specified condition. The processor of the object display apparatus may identify a priority of the any one group including the object.

For example, the first object 805 may be identified as being included in a group with rank 1. For example, the second object 807, the third object 809, the fourth object 811, and the fifth object 813 may be identified as being included in a group with rank 2. For example, the sixth object 815 may be identified as being included in a group with rank 3.

Because only the first object 805 is included in the group with rank 1, the processor of the object display apparatus may sort the first object 805.

The processor of the object display apparatus may sort the second object 807, the third object 809, the fourth object 811, and the fifth object 813, which are included in the group with rank 2.

The processor of the object display apparatus may sort the second object 807, the third object 809, the fourth object 811, and the fifth object 813, which are included in the group with rank 2, based on longitudinal position information. The processor of the object display apparatus may sort the second object 807, the third object 809, the fourth object 811, and the fifth object 813 in an order of the fifth object 813, the fourth object 811, the third object 809, and the second object 807, in the group with rank 2.

Because only the sixth object 815 is included in the group with rank 3, the processor of the object display apparatus may sort the sixth object 815.

The processor of the object display apparatus may identify priorities of objects, based on the priority of the group and the sorted result. For example, the priority of the first object 805 among all objects included in a first frame before obtaining a code indicating a specified error may be rank 1. For example, the priority of the fifth object 813 among all the objects may be rank 2. For example, the priority of the fourth object 811 among all the objects may be rank 3. For example, the priority of the third object 809 among all the objects may be rank 4. For example, the priority of the second object 807 among all the objects may be rank 5. For example, the priority of the sixth object 815 among all the objects may be rank 6.

If the processor of the object display apparatus selects all of objects, each of which has a priority ahead of rank 6, as display targets, the first object 805, the second object 807, the third object 809, the fourth object 811, and the fifth object 813 may be selected as display targets. The sixth object 815 may be identified as an object which is not the display target.

If the processor of the object display apparatus selects all of objects, each of which has a priority ahead of rank 7, as display targets, the first object 805, the second object 807, the third object 809, the fourth object 811, the fifth object 813, and the sixth object 815 may be selected as the display targets.

Figure 9:
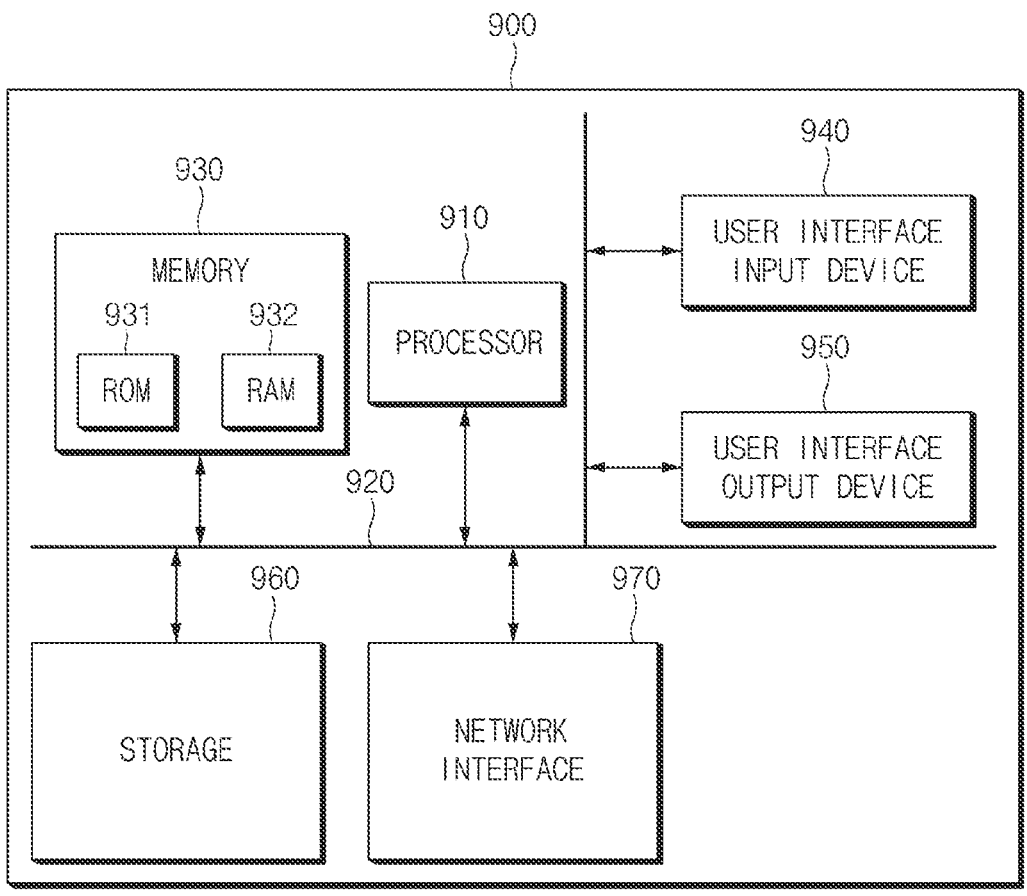
FIG. 9 illustrates a computing system associated with an object display apparatus or an object display method.

FIG. 9 illustrates a computing system associated with an object display apparatus or an object display method.

Referring to FIG. 9, a computing system 900 may include at least one processor 910, a memory 930, a user interface input device 940, a user interface output device 950, storage 960, and a network interface 970, which are connected with each other via a bus 920.

The processor 910 may be a central processing unit (CPU) or a semiconductor device that processes instructions stored in the memory 930 and/or the storage 960. The memory 930 and the storage 960 may include various types of volatile or non-volatile storage media. For example, the memory 930 may include a read only memory (ROM) 931 and a random access memory (RAM) 932.

Accordingly, the operations of the method or algorithm described in connection with the one or more example embodiments disclosed in the specification may be directly implemented with a hardware module, a software module, or a combination of the hardware module and the software module, which is executed by the processor 910. The software module may reside on a storage medium (that is, the memory 930 and/or the storage 960) such as a RAM, a flash memory, a ROM, an EPROM, an EEPROM, a register, a hard disc, a removable disk, and a CD-ROM.

The exemplary storage medium may be coupled to the processor 910. The processor 910 may read out information from the storage medium and may write information in the storage medium. Alternatively, the storage medium may be integrated with the processor 910. The processor and the storage medium may reside in an application specific integrated circuit (ASIC). The ASIC may reside within a user terminal. In another case, the processor and the storage medium may reside in the user terminal as separate components.

Hereinabove, although the present disclosure has been described with reference to one or more example embodiments and the accompanying drawings, the present disclosure is not limited thereto, but may be variously modified and altered by those skilled in the art to which the present disclosure pertains without departing from the spirit and scope of the present disclosure claimed in the following claims.

Therefore, example embodiments of the present disclosure are not intended to limit the technical spirit of the present disclosure, but provided only for the illustrative purpose. The scope of the present disclosure should be construed on the basis of the accompanying claims, and all the technical ideas within the scope equivalent to the claims should be included in the scope of the present disclosure.

What is claimed is:

1. An apparatus of a vehicle, the apparatus comprising:
 a sensor; and
 a processor configured to:
   determine an object located in front of the vehicle based on contour points in a first frame obtained via the sensor at a first time and further based on a code, obtained at a second time later than the first time, indicating an error;
   determine information indicating at least one of:
     a lane in which the object is located,
     a longitudinal component of a distance between the object and the vehicle,
     a lateral component of the distance,
     a classification of the object,
     a quantity of a portion of the contour points that is included in an object box indicating the object, or
     a size of the object box;
   determine whether the object is included in a first group among a plurality of groups divided according to an importance of the object, based on the information;
   sort the object and at least one other object included in the first group, based on the longitudinal component;
   determine a priority of the object among all objects identified in the first frame, based on a priority of the first group and a result of the sorting of the object;

select the object as a display target in a second frame, obtained at a third time later than the second time, based on a determination that the priority of the object is greater than a specified priority; and control, based on the object being selected as the display target, autonomous driving of the vehicle.

2. The apparatus of claim 1, wherein the processor is configured to determine whether the object is included in the first group by:

determining coordinates of a point corresponding to the vehicle;

obtaining an indication of a curvature of a path on which the vehicle operates;

determining whether the longitudinal component is less than a threshold value; and determining whether the object is included in the first group, further based on the longitudinal component being less than the threshold value, and wherein the threshold value is one of:

a first value, based on the curvature being greater than or equal to a specified curvature value, or a second value greater than the first value, based on the curvature being less than the specified curvature value.

3. The apparatus of claim 1, wherein the processor is further configured to:

determine coordinates of a point corresponding to the vehicle;

sort a second object, having a first longitudinal position value, among the second object and the at least one other object included in the first group by assigning, to the second object, a first priority; and sort a third object, having a second longitudinal position value less than the first longitudinal position value by assigning, to the third object, a second priority greater than the first priority.

4. The apparatus of claim 1, wherein the code indicates that a point cloud for generating the contour points has not been obtained within a specified time window.

5. The apparatus of claim 1, wherein the lane is a first lane, wherein the processor is further configured to:

assign a first priority to a second group that includes a second object associated with a second lane; and assign a second priority, which is greater than the first priority, to a third group that includes a third object associated with a third lane, wherein a distance between the first lane and the second lane is greater than a distance between the first lane and the third lane.

6. The apparatus of claim 1, wherein the processor is further configured to:

select all objects included in the first group as display targets in the second frame, based on a determination that the priority of the first group is greater than a priority of a specified group.

7. The apparatus of claim 1, wherein the processor is further configured to:

determine a speed of the vehicle, and control the autonomous driving of the vehicle further based on a path determined to avoid obstacles comprising the selected object, and wherein the specified priority and the speed of the vehicle have an inverse correlation.

8. The apparatus of claim 1, wherein the processor is configured to identify whether the object corresponds to a display target in a straight driving environment or a display target in a curved driving environment, and wherein the processor is configured to select the object as the display target by:

selecting the object as the display target in the second frame further based on:

the classification of the object being one of a pedestrian or a preceding vehicle, and the vehicle being located in the lane or in a second lane adjacent to the lane.

9. The apparatus of claim 1, wherein the processor is configured to select the object as the display target by:

obtaining, from a map system, a signal indicating that the vehicle is located in an area that is not a highway;

determining that the classification of the object is a pedestrian; and selecting the object as the display target in the second frame further based on the signal and a determination that the classification of the object is the pedestrian.

10. The apparatus of claim 1, wherein the processor is configured to determine whether the object is included in the first group by:

determining whether the object is included in the first group further based on a length of a longer of a longitudinal segment of the object box and a lateral segment of the object box being greater than a threshold length.

11. A method performed by an apparatus of a vehicle, the method comprising:

determining an object located in front of the vehicle based on contour points in a first frame obtained via a sensor at a first time and further based on a code, obtained at a second time alter than the first time, indicating an error;

determining information indicating at least one of:

a lane in which the object is located, a longitudinal component of a distance between the object and the vehicle, a lateral component of the distance, a classification of the object, a quantity of a portion of the contour points that is included in an object box indicating the object, or a size of the object box;

determining whether the object is included in a first group among a plurality of groups divided according to an importance of the object, based on the information;

sorting the object and at least one other object included in the first group, based on the longitudinal component;

determining a priority of the object among all objects identified in the first frame, based on a priority of the first group and a result of the sorting of the object;

selecting the object as a display target in a second frame, obtained at a third time later than the second time, based on a determination that the priority of the object is greater than a specified priority; and controlling, based on the object being selected as the display target, autonomous driving of the vehicle.

12. The method of claim 11, wherein the determining of whether the object is included in the first group comprises:

determining coordinates of a point corresponding to the vehicle;

obtaining an indication of a curvature of a path on which the vehicle operates;

determining whether the longitudinal component is less than a threshold value; and determining whether the object is included in the first group, further based on the longitudinal component being less than the threshold value, and wherein the threshold value is one of:

a first value, based on the curvature being greater than or equal to a specified curvature value, or a second value greater than the first value, based on the curvature being less than the specified curvature value.

13. The method of claim 11, further comprising:

determining coordinates of a point corresponding to the vehicle;

sorting a second object, having a first longitudinal position value, among the second object and the at least one other object included in the first group by assigning, to the second object, a first priority; and sorting a third object, having a second longitudinal position value less than the first longitudinal position value by assigning, to the third object, a second priority greater than the first priority.

14. The method of claim 11, wherein the code indicates that a point cloud for generating the contour points has not been obtained within a specified time window.

15. The method of claim 11, wherein the lane is a first lane, wherein the method further comprises:

assigning a first priority to a second group that includes a second object associated with a second lane; and assign a second priority, which is greater than the first priority, to a third group that includes a third object associated with a third lane, and wherein a distance between the first lane and the second lane is greater than a distance between the first lane and the third lane.

16. The method of claim 11, further comprising:

selecting all objects included in the first group as display targets in the second frame, based on a determination that the priority of the first group is greater than a priority of a specified group.

17. The method of claim 11, further comprising:

determining a speed of the vehicle, wherein the controlling of the autonomous driving of the vehicle is further based on a path determined to avoid obstacles comprising the selected object, and wherein the specified priority and the speed of the vehicle have an inverse correlation.

18. The method of claim 11, further comprising identifying whether the object corresponds to a display target in a straight driving environment or a display target in a curved driving environment, wherein the selecting of the object as the display target comprises:

selecting the object as the display target in the second frame further based on:

the classification of the object being one of a pedestrian or a preceding vehicle, and the vehicle being located in the lane or in a second lane adjacent to the lane.

19. The method of claim 11, wherein the selecting of the object as the display target comprises:

obtaining, from a map system, a signal indicating that the vehicle is located in an area that is not a highway;

determining that the classification of the object is a pedestrian; and selecting the object as the display target in the second frame further based on the signal and a determination that the classification of the object is the pedestrian.

20. The method of claim 11, wherein the determining of whether the object is included in the first group comprises:

determining whether the object is included in the first group further based on a length of a longer of a longitudinal segment of the object box and a lateral segment of the object box being greater than a threshold length.

* * * * *